United States Patent

Boeters et al.

[15] 3,662,228

[45] May 9, 1972

[54] CIRCUIT ARRANGEMENT FOR GENERATING A SIGNAL AND FOR SUPPRESSING VOLTAGE PEAKS

[72] Inventors: Karl-Ernst Boeters, Berlin; Gerhard Conzelmann, Leinfelden; Klaus Streit, Tuebingen; Hans-Joachim Fleischer, Berlin, all of Germany

[73] Assignee: Robert Bosch GmbH, Stuttgart, Germany

[22] Filed: July 17, 1970

[21] Appl. No.: 55,881

[30] Foreign Application Priority Data

July 22, 1969 Germany....................P 19 37 114.3

[52] U.S. Cl.....................317/148.5 R, 317/DIG. 6, 307/93, 323/DIG. 1

[51] Int. Cl. ....................................H01h 47/32

[58] Field of Search..................317/DIG. 6, 33, 148.5, 11 B, 317/11 E; 323/DIG. 1; 307/93, 273, 100

[56] References Cited

UNITED STATES PATENTS

| | | | |
|---|---|---|---|
| 3,340,407 | 9/1967 | Sinclair | 317/DIG. 6 |
| 3,320,551 | 5/1967 | Miller | 307/273 |

*Primary Examiner*—D. F. Duggan
*Assistant Examiner*—Harvey Fendelman
*Attorney*—Michael S. Striker

[57] ABSTRACT

The diode comprised between two electrodes of a transistor is shunted across the inductor, the third transistor electrode being the output electrode. The diode is connected with respect to its polarity so that it only conducts when the current flow through the inductor is broken.

9 Claims, 8 Drawing Figures

INVENTORS
Karl-Ernst BOETERS
Gerhard CONZELMANN
Klaus STREIT
Hans-Joachim FLEISCHER By: Michael S. Striker
their ATTORNEY

CIRCUIT ARRANGEMENT FOR GENERATING A SIGNAL AND FOR SUPPRESSING VOLTAGE PEAKS

BACKGROUND OF THE INVENTION

The invention relates to a circuit arrangement for generating an output voltage signal and for suppressing voltage peaks that occur when the flow of current through an inductor is stopped.

Various schemes are known in the prior art for protecting switching units from the voltage peaks that occur when the unit breaks the current flow through an inductor. One such scheme employs a bypass diode that alone, or in series with a resistor, is shunted across the inductor. The polarity of the diode is such that when current flows through the inductor the diode does not conduct, but does conduct when the current flow is broken. The diode continues to conduct until the current completely dies away.

It is well known that the function of a diode can be assumed by a transistor. This is frequently the case where diodes are made using the techniques of monolithic integrated circuits. Since the third electrode of the transistor used as a diode, in these integrated circuits, serves no purpose, it is either left unconnected or else it is connected to one of the other two diodes. Alternatively, it is not diffused into the semiconductor material.

When there is required an output signal corresponding to the switching accomplished, additional components, such as a further transistor, are necessary for generating the desired signal.

SUMMARY OF THE INVENTION

An object of the invention is to provide a simple circuit arrangement that uses a single transistor to suppress voltage peaks and to generate a voltage signal.

The circuit arrangement consists essentially of inductor means having terminals, switch means, such as a transistor, connected to one of the two terminals and defining a switching path to the inductor means when the switching means are operated; and a transistor having two electrodes and an output electrode, said two electrodes being connected to respective ones of said two terminals and defining a diode having a predetermined polarity, said polarity being selected so that said diode is rendered conductive to conduct the current of said inductor means only when said switch means are opened, whereby the output voltage signal appears on said output electrode and the voltage peaks are suppressed.

The novel features which are considered as characteristic for the invention are set forth in particular in the appended claims. The invention, itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
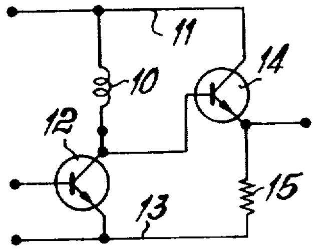
FIGS. 1 to 4 are circuit diagrams of four different embodiments of the invention.

With reference to FIG. 1, one end of a coil 10 is connected to a positive line 11 and the other end to the collector of a switching transistor 12, the emitter of which is connected to a negative line 13. The junction between the collector of the switching transistor 12 and the coil 10 is connected to the base of the transistor 14. The collector of this transistor is connected to the positive line 11 and the emitter is connected through a resistance 15 to the negative line 13.

This circuit operates in the following manner. If a positive voltage, or signal, is conducted to the base of the switching transistor 12, the transistor 12 becomes conductive and a current flows through the coil 10. The voltage at the junction between the collector of transistor 12 and the coil 10 becomes negative and the transistor 14 consequently is turned off. The signal appearing at the output electrode of transistor 14 is likewise negative. If, now, a negative voltage is conducted to the base of the transistor 12, this transistor is turned off and current stops flowing through the coil 10. When the current is stopped through the coil 10 a voltage is induced in the coil that causes a strongly positive-going voltage at the collector of the switching transistor 12. This voltage could destroy the transistor 12. However, when the transistor 12 is turned off the positive voltage at the collector of this transistor causes the bypass diode, formed by the base and collector electrodes of the transistor 14, to become conductive. This diode conducts the current caused by the voltage induced in the coil 10 until the current completely dies out. At the same time that the switching transistor 12 is turned off there appears at the output electrode of the transistor electrode 14 a positive signal, since this latter transistor now conducts. It will be noted that the switching transistor 12 defines a switching path from its emitter to its collector.

Figure 2:
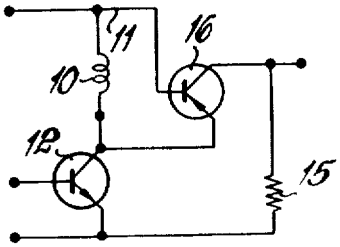

FIG. 2 shows a second embodiment. One terminal of the coil 10 is connected to the positive line 11 and the other terminal to the collector of the switching transistor 12, the emitter of which is connected to the negative line 13. The switching transistor 12 is of the npn-type. The emitter of a pnp-transistor 16 is connected to the junction between the collector of the transistor 12 and the coil 10. The base of the transistor 16 is connected to the positive line 11 and the collector serves as the output electrode, a collector being connected through a resistor 15 to the negative line 13. This circuit operates in the following manner. When a positive signal appears at the base of the switching transistor 12 this transistor becomes conductive, and a current begins to flow through the coil 10. The collector of the transistor 12 is negative; and the bypass diode, formed by the base electrode and the emitter electrode of transistor 16, is rendered non-conductive. A negative output signal appears on the collector electrode of transistor 16. Should there appear at the base of transistor 12 a negative signal, the transistor 12 becomes non-conductive and current stops flowing through the coil 10. The voltage induced in the coil 10 renders the transistor conductive and keeps it conductive until the coil current completely dies out in the circuit formed by the coil 10, the emitter electrode and the base electrode of transistor 16. During this time there appears at the output electrode, a collector, of transistor 16 an output signal. The time constant with which the coil current dies away depends essentially on the electrical characteristics of the coil 10.

Figure 3:
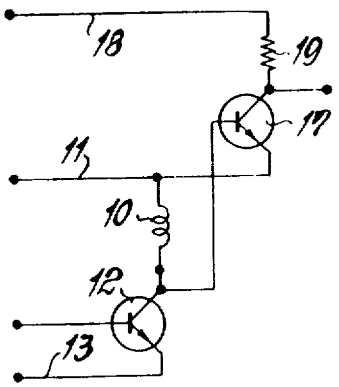

A still further embodiment is shown in FIG. 3. One terminal of a coil 10 is connected to the positive line 11 and the other terminal to the collector of a switching transistor 12, the emitter of which is connected to the negative line 13. To the collector of transistor 12 is connected the base of a transistor 17, of which the emitter is connected to the positive line 11 and the collector through a resistor 19 to a positive line 18. The voltage on line 18 is higher than the voltage on line 11. The bypass diode, connected across the coil 10, is formed by the base electrode and the emitter electrode of transistor 17, the output signal voltage appearing on the collector of this transistor.

The operation of this circuit is fundamentally the same as with the previous embodiments. If a positive signal appears at the base of transistor 12, a current flows through the coil 10. If a negative voltage appears at the base of the transistor 12, the latter is turned off; and current stops flowing through the coil 10. The voltage thereby induced in the coil 10 turns on the transistor 17 and keeps it turned on until there dies away the coil current through the bypass diode composed of the base and emitter electrode of transistor 17. When the coil current is shut off there appears an output signal on the collector of transistor 17. This output signal remains until the coil current through the base-emitter path of transistor 17 and through the coil 10 dies away.

Figure 4:
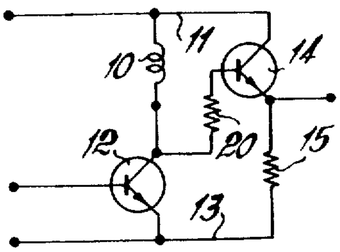

A final embodiment is shown in FIG. 4. This form of the invention is substantially the same as that shown in FIG. 1. One terminal of the coil 10 is connected to the positive line 11 and the other terminal to the collector electrode of transistor 12, the emitter of which is connected to the negative line 13. The transistor 14 is not directly connected to the collector of the switching transistor 12. Instead, a resistor 20 is connected between the base of transistor 14 and the collector of transistor 12. The manner of operation of this embodiment is fundamentally the same as that of the circuit shown in FIG. 1. However, the time constant with which the coil current dies away is now dependent on the value of the resistor 20.

The embodiments of FIGS. 1–4 can also be used with transistors of the opposite conductive type simply by reversing the polarity of the voltage source.

Figure 6:
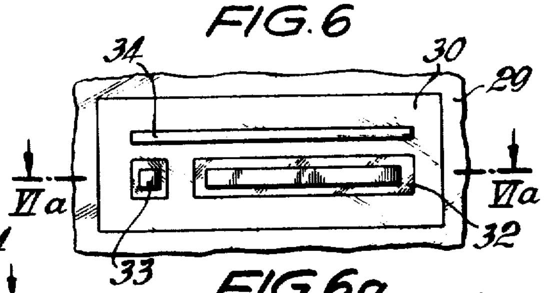
FIGS. 6 and 6*a* respectively show the layout in plan and side views of a transistor suitable for another embodiment of the invention.
Figure 5:
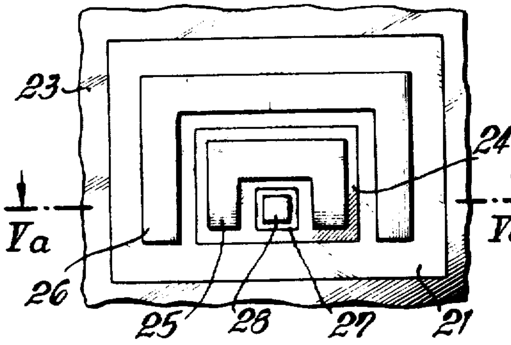
FIGS. 5 and 5*a* respectively show the layout in plan and side views of a transistor suitable for certain of the embodiments.
Figure 6A:
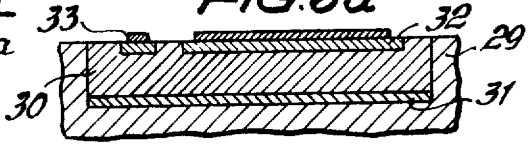
Figure 5A:
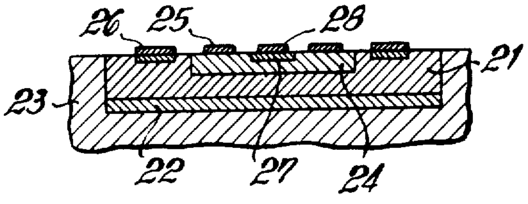

FIGS. 5 and 6 show advantageous realizations of transistors 14 and 16 as shown in FIGS. 1 and 2. The npn transistor shown in FIG. 5 has an n-doped shell 21 and a more strongly n-doped conductive layer 22, which, as is usually the case, is embedded in a p-conductive substrate 23. The p-conductive base region 24 and the respective base and collector contacts 25 and 26 have relatively large surface areas for conducting the large coil current. The emitter 27 and its contact 28 occupy only a little space, since the current through the resistor 15 is kept small.

FIG. 6 shows in side and plan views a lateral transistor made in accordance with monolithic integration techniques. The base-emitter diode has a large surface area, whereas the collector, which carries only the small signal current of the output signal, has only a small surface area. The p-conductive substrate is denoted by reference numeral 29, the base, which is n-conductive, by 30, and the conductive layer, located underneath the base, by 31. The emitter 32 and the collector 33 are made in the customary mannyer by a p-diffusion into the base material. In the transistor of FIG. 6 the coil current can flow from both longitudinal sides of the emitter 32 through the conductive layer 31 to the base contact 34. The relatively small collector current flows from the narrow side of the emitter 32 directly through the base layer 30 to the collector 33.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A circuit arrangement for generating an output voltage signal and for suppressing voltage peaks, comprising, in combination, inductor means having two terminals; switch means connected to one of said two terminals and defining a switching path to said inductor means and causing voltage peaks induced in said inductor means when said switching means are operated; and a transistor having two electrodes and an output electrode, said two electrodes being connected to respective ones of said two terminals and defining a diode having a predetermined polarity, said polarity being selected so that said diode is rendered conductive to conduct the current of said inductor means only when said switch means are open, whereby the output voltage signal appears on said output electrode and the voltage peaks are suppressed.

2. A circuit arrangement as defined in claim 1, wherein said switching means are a switching transistor, and said two electrodes are the base and the collector, and said output electrode is the emitter, and said switching transistor and said transistor are of the same conductive type.

3. A circuit arrangement as defined in claim 2, including an operating voltage, and wherein respective ones of said two terminals are connected to the collector of said switching transistor and said operating voltage, and the base of said transistor is connected to the collector of said switching transistor.

4. A circuit arrangement as defined in claim 2, including first and second operating voltages of the same polarity, said second operating voltage being greater than said first operating voltage, and wherein the emitter and the base of said transistor are respectively connected to said first operating voltage and the collector of said switching transistor, and respective ones of said two terminals are connected to the collector of said switching transistor and the emitter of said transistor, and further including resistance means connecting the collector of said transistor to said second operating voltage.

5. A circuit arrangement as defined in claim 1, including an operating voltage, and wherein said switch means are a switching transistor, and said transistor and said switching transistor are of oppositely conductive types, and respective ones of said two terminals are connected to the collector of said switching transistor and said operating voltage, the base and the emitter of said transistor are respectively connected to said operating voltage and the collector of said switching transistor.

6. A circuit arrangement as defined in claim 1, wherein said two electrodes are the base and the emitter, and said output electrode is the collector.

7. A circuit arrangement as defined in claim 1, including resistance means connected in series with said diode.

8. A circuit arrangement as defined in claim 1, wherein at least part of the circuit arrangement is a monolithic integrated circuit.

9. A circuit arrangement as defined in claim 1, wherein the surface area of said output electrode is smaller than that of either of said two electrodes.

* * * * *